US007475746B2

(12) United States Patent
Tsukada et al.

(10) Patent No.: US 7,475,746 B2
(45) Date of Patent: Jan. 13, 2009

(54) VEHICULAR PERFORMANCE CONTROL SYSTEM AND METHOD, AND VEHICLE INCORPORATING SAME

(75) Inventors: Yoshiaki Tsukada, Saitama (JP); Takashi Ozeki, Saitama (JP); Hiroyuki Kojima, Saitama (JP); Hiroaki Uchisasai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 526 days.

(21) Appl. No.: 11/233,343

(22) Filed: Sep. 22, 2005

(65) Prior Publication Data

US 2006/0065239 A1 Mar. 30, 2006

(30) Foreign Application Priority Data

Sep. 30, 2004 (JP) ............................ 2004-289269

(51) Int. Cl.
*B62D 61/00* (2006.01)

(52) U.S. Cl. ..................................... 180/65.2; 180/218

(58) Field of Classification Search ................. 180/219, 180/220, 65.1, 65.2
See application file for complete search history.

(56) References Cited

U.S. PATENT DOCUMENTS 4,653,005 A * 3/1987 Osanai et al. ................. 701/62
4,917,206 A * 4/1990 Hara .......................... 180/179
6,157,885 A * 12/2000 Sakaguchi et al. ............ 701/54
6,480,775 B2 * 11/2002 Cho ............................ 701/51
6,769,419 B2 * 8/2004 Kanai et al. ................. 123/520

FOREIGN PATENT DOCUMENTS

JP 2003-04193 2/2003

* cited by examiner

*Primary Examiner*—Christopher P Ellis
*Assistant Examiner*—Brian Swenson
(74) *Attorney, Agent, or Firm*—Carrier, Blackman & Associates, P.C.; William D. Blackman; Joseph P. Carrier

(57) ABSTRACT

A performance control system is provided that is adapted to regulate the output of an engine while maintaining stable combustion whereby the perceived operational feel and exhaust efficiency is improved. The performance control system includes an accelerator position sensor for detecting the position of an accelerator by a driver, an electronically controlled throttle adjuster for adjusting the opening of a throttle valve mounted in the intake pipe of an engine with a motor, and a control unit for controlling the throttle adjuster based on the output of the accelerator position sensor. When the engine output, characterized by engine speed or vehicle speed, reaches a predetermined value, the opening of the throttle valve is reduced from the standard opening of the throttle valve, based on the position of the accelerator.

15 Claims, 6 Drawing Sheets

FIG. 5
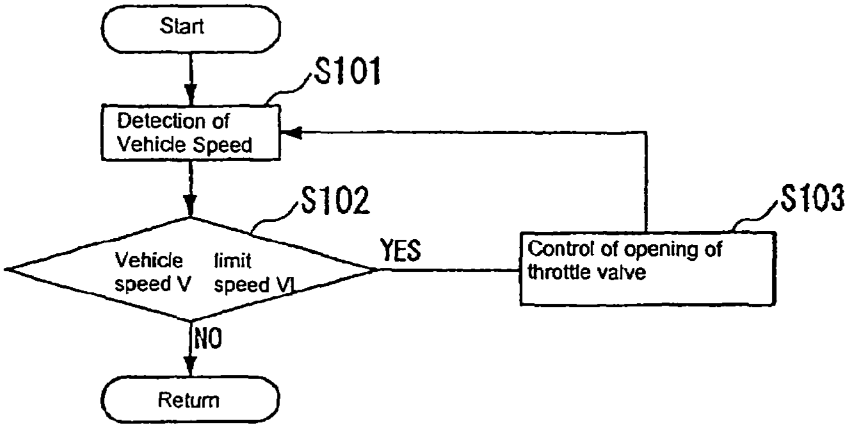
FIG. 6
FIG. 6(A)
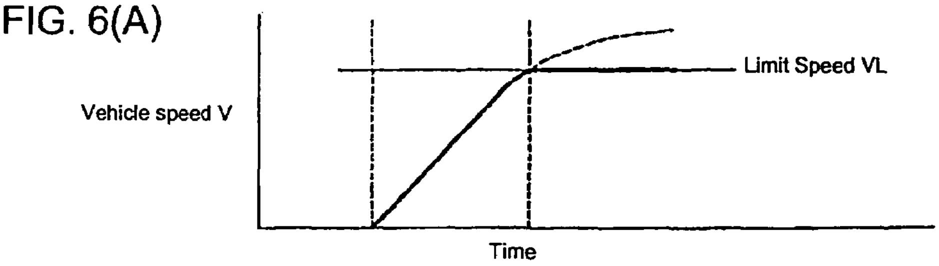
FIG. 6(B)
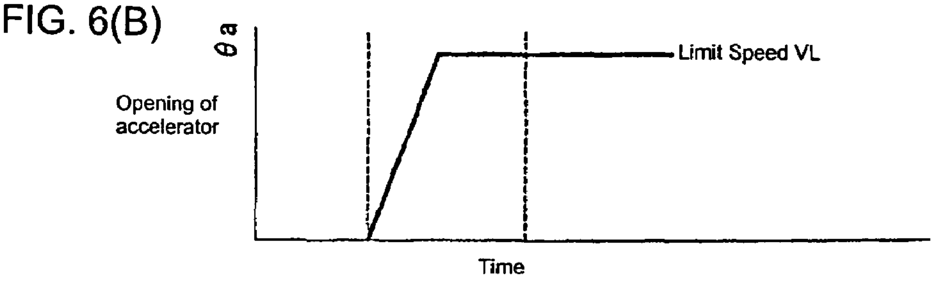
FIG. 6(C)
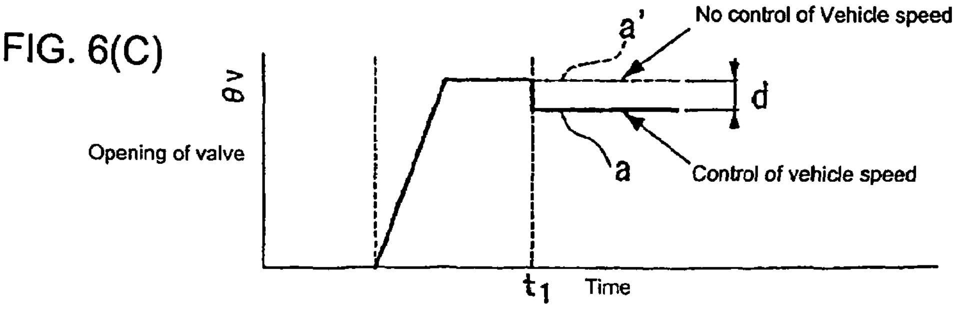

VEHICULAR PERFORMANCE CONTROL SYSTEM AND METHOD, AND VEHICLE INCORPORATING SAME

CROSS-REFERENCE TO RELATED APPLICATIONS

The present invention claims priority under 35 USC 119 based on Japanese patent application No. 2004-289269, filed Sep. 30, 2004. The subject matter of this priority document is incorporated by reference herein.

BACKGROUND OF THE INVENTION

1. Field of the Invention

The present invention relates to a performance control system and method for controlling the performance output of an engine, to ensure that at least one speed parameter, which is engine speed, vehicle speed, or both, does not exceed a maximum allowed value for that speed parameter. The present invention also relates to a vehicle incorporating the inventive performance control system.

2. Description of the Background Art

It is well known to equip a vehicle engine with a performance control system. The performance control system prevents the engine speed, or alternatively the vehicle speed, from exceeding a predetermined maximum value. In the known performance control systems, engine output control is accomplished by cutting or thinning down the number of engine ignition firing times, or by interrupting the fuel supply to the engine, when the output reaches the predetermined value. Such a performance control system is disclosed, for example, in JP-A No. 2003-41963.

However, since this known prior art performance control system regulates the output of the engine by reducing the number of engine ignition firing times, or by interrupting fuel supply to the engine, it is assumed that engine combustion temporarily becomes unstable, thereby causing deterioration in the operational feel of the vehicle, and a reduction in exhaust efficiency.

It is therefore an object of the present invention to provide a performance control system capable of regulating the output of an engine while maintaining stable engine combustion, thereby improving the operational feel of the vehicle and improving exhaust efficiency.

SUMMARY

To attain the above object, a first aspect of the invention relates to a performance control system for regulating the output of an engine to ensure that the engine speed, or alternatively the vehicle speed, does not exceed a predetermined maximum value. The performance control system includes an accelerator position sensor (for example, the accelerator position sensor 91 in an embodiment described hereinafter) for detecting the position of an accelerator selected by a driver. The performance control system also includes an electronically controlled throttle adjuster (for example, the throttle adjuster 90 in the embodiment described hereinafter) for adjusting an opening of a throttle valve (for example, the throttle valve 17 in the embodiment described hereinafter) mounted in the intake pipe of an engine. The performance control system further includes a controller (for example, the control unit 7 in the embodiment described hereinafter) for controlling the throttle adjuster, based on the output of the accelerator position sensor.

When the selected speed parameter reaches the predetermined maximum value, the opening of the throttle valve is automatically reduced to a level at or below an applied opening thereof that immediately preceded the reaching of the maximum allowed value, based on the sensed position of the accelerator.

In this aspect of the invention, when the engine speed, or the vehicle speed, reaches the predetermined value, the throttle adjuster is controlled to reduce the actual opening of the throttle valve to a level at or below an applied opening thereof that immediately preceded the reaching of the maximum allowed value, based on the sensed position of the accelerator. Although the amount of intake air in the engine is slightly reduced to control the output of the engine, the engine combustion remains stable.

A second aspect of the invention relates to a performance control system wherein the opening of the throttle valve is gradually reduced when the engine speed or the vehicle speed reaches the predetermined maximum value. In this case, the operator does not receive a sudden sense of difference in engine operation caused by a sudden reduction in the opening of the throttle.

A third aspect of the invention relates to a performance control system for use in a hybrid vehicle, equipped with both an internal combustion engine and an electric motor. In the hybrid vehicle application, the performance control system includes an accelerator position sensor for detecting the position of an accelerator by a driver, and an electronically controlled throttle adjuster for adjusting the opening of a throttle valve mounted in the intake pipe of an engine. The performance control system further includes a controller for controlling the throttle adjuster based on the output of the accelerator position sensor, and the electric motor for supplying power to a drive wheel, based on power provided by a battery.

The performance control system is capable of switching the drive source of the vehicle between the engine and the electric motor, regulating the output of the engine to ensure that the engine speed or the vehicle speed does not exceed the predetermined maximum value, and determining the control of the output of the electric motor based on the output of the accelerator position sensor. When the engine speed, or the vehicle speed, reaches the predetermined value, the opening of the throttle valve is reduced to a level at or below an applied opening thereof that immediately preceded the reaching of the maximum allowed value, based on the sensed position of the accelerator.

In the third aspect of the invention, the vehicle operates in one of the following three modes: Engine drive mode, electric motor drive mode, and combined engine and electric motor drive mode. When the vehicle is driven by the engine (that is, is in engine drive mode), the actual opening of the throttle valve is reduced from the standard opening by the control of the throttle adjuster to regulate the output of the engine. Therefore, the engine combustion remains stable. When the vehicle is driven by the electric motor, the motor is accurately controlled based on the output of the accelerator position sensor.

According to the first aspect of the invention, since the output of the engine is regulated by reducing the actual opening of the throttle valve from a standard opening, based on the position of the accelerator, engine combustion is stable. As a result, the operational feel and exhaust efficiency are improved, as compared with the prior art performance control system.

According to the second aspect of the invention, since the opening of the throttle is not suddenly reduced when the output of the engine is regulated, the operational feel is further improved.

According to the third aspect of the invention, since the output of the engine is regulated by reducing the actual opening of the throttle valve from the standard opening, based on the position of the accelerator when the vehicle is driven by the engine, engine combustion is stable. As a result, in all of the engine drive, electric motor drive and engine/electric motor drive modes, an operational feel without a sense of operating difference is obtained, and when the vehicle is driven by the engine, exhaust efficiency is improved.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 5 is a flow diagram of the control of the throttle valve opening by the performance control system hereof, showing the processing flow of the performance control system mounted on the vehicle of FIG. 1.

FIG. 6(A) is a graph of vehicle speed (V) versus time, in which a solid line shows the actual vehicle speed as controlled by the controller, and a broken line shows an unregulated vehicle speed.

FIG. 6(B) is a graph of accelerator operation (θa) versus time over the same time period as shown in FIG. 6(A).

FIG. 6(C) is a graph of throttle valve opening (θv) versus time over the same time period as shown in FIG. 6(A), in which after a time $t_1$, the throttle valve opening is reduced step-wise from an opening amount, corresponding to no regulation by the performance control system (shown by broken line a'), by an amount d, to a regulated opening amount (shown by solid line a)

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the following relative positional terms such as "front side", "right side" and "left side" correspond to those directions considered from the vantage point of a vehicle operator, seated in the driver's seat and facing forwardly.

Figure 1:
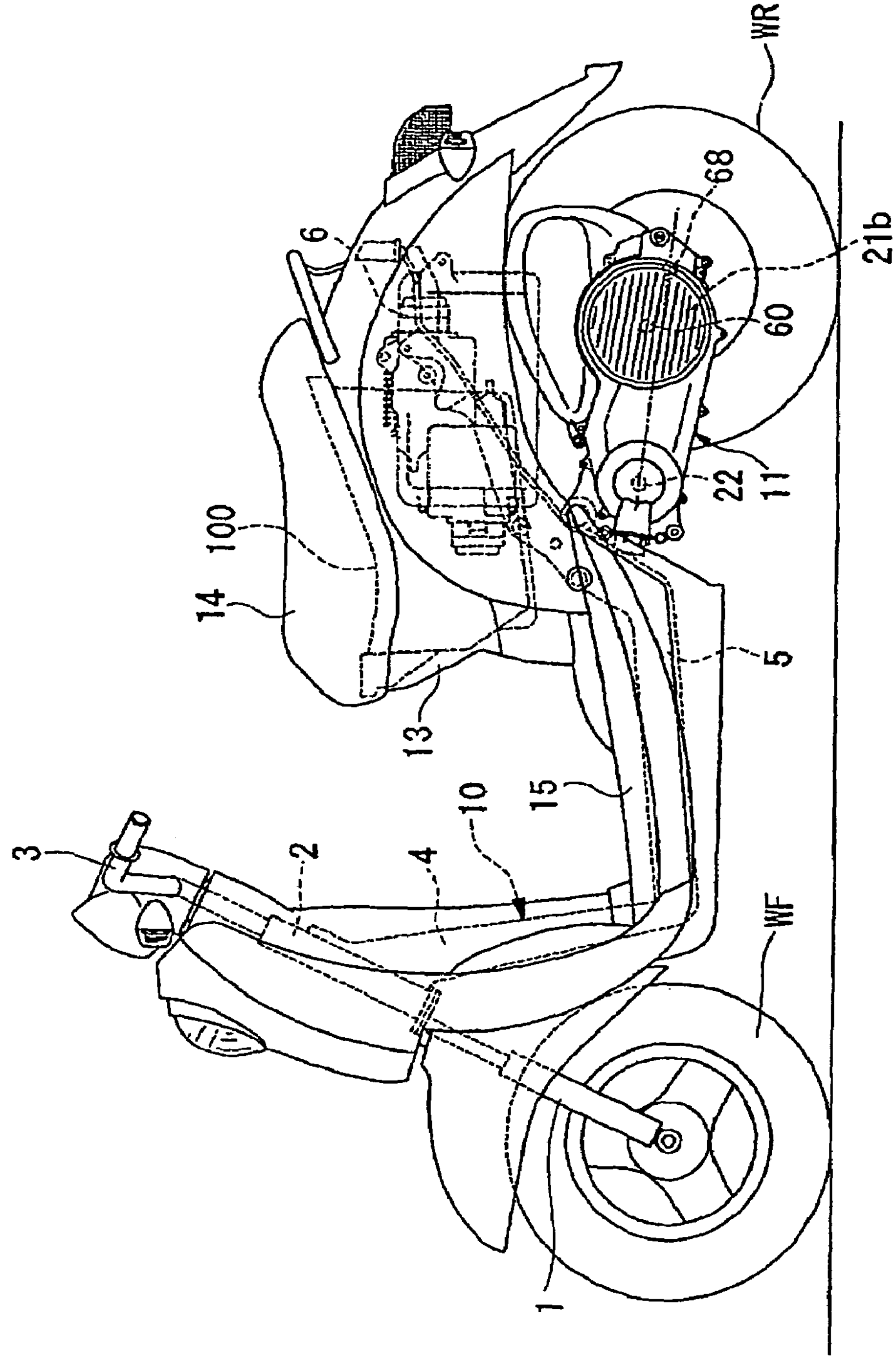
FIG. 1 is a side plan view of a vehicle according to a selected illustrative embodiment of the present invention, showing a power unit mounted between the vehicle frame and the rear wheel.

The vehicle of the depicted embodiment is a hybrid scooter. In this vehicle, as shown in FIG. 1, a power unit 11 including an electric motor 21*b* is rotatably supported on a body frame 10, together with a rear wheel WR, as a swing-type power unit.

A front fork 1 supports a front wheel WF, is arranged at the front of the body of the vehicle, and is rotatably supported in a head pipe 2. The head pipe 2 is part of the body frame 10. The upper end portion of the front fork 1 is connected to a handlebar 3, so that the vehicle can be steered by the operation of this handlebar 3. The head pipe 2 is provided with a down pipe 4 extending downward and toward the rear of the vehicle. An intermediate frame 5 extends substantially horizontally from the lower end of this down pipe 4. A rear frame 6 extends upwardly from the rear end of the intermediate frame 5 toward the rear of the vehicle. The body frame 10 is composed essentially of the above-described components including the head pipe 2, down pipe 4, intermediate frame 5 and rear frame 6.

The body frame 10 is covered with a body cover 13, and a seat 14 for a rider is fixed on a projecting portion of the body frame 10, so as to be substantially at the center of the body cover 13. A step floor 15, on which the rider puts his/her feet, is formed below and in front of the seat 14. Below the seat 14, a storage box 100 is provided which serves as a utility space for storing a helmet and/or other belongings.

The overall constitution of the power unit 11 will now be described, with reference to FIG. 2. The power unit 11 includes an engine 20 as a primary power source, and an ACG stator motor 21*a* which functions as a starter for starting the engine 20 and also as a generator. The power unit 11 includes a continuously variable transmission 23 for changing the power of the engine 20 into a change gear ratio based on the operation speed of the engine and transmitting it to the drive wheel (rear wheel WR). The power unit 11 also includes a centrifugal clutch 40 for cutting off power transmission, interposed between the engine 20 and the continuously variable transmission 23, and a one-way clutch 44, for transmitting power to the rear wheel WR from the continuously variable transmission 23, but not to the continuously variable transmission 23 from the rear wheel WR. The power unit 11 further includes a speed-reducing mechanism 69, interposed between the rear wheel WR side output portion (slave shaft 60) of this one-way clutch 44 and the axle 68 of the rear wheel WR. The speed-reducing mechanism 69 is provided for decelerating the output to be transmitted to the rear wheel WR. The electric motor 21*b*, which is connected to the input side of the speed-reducing mechanism 69, serves as an engine so as to provide a secondary power source, and also as a generator. In this embodiment, the continuously variable transmission 23, the slave shaft 60, the speed-reducing mechanism 69, etc. constitute a power transmission unit for transmitting the power of the engine 20 to the drive wheel (rear wheel WR).

The power unit 11 has two drive systems. One of the two drive systems transmits the power of the engine 20 to the rear wheel WR through the centrifugal clutch 40, the continuously variable transmission 23, the one-way clutch 44, the slave shaft 60 and the speed-reducing mechanism 69. The other drive system transmits the power of the electric motor 21*b* to the rear wheel WR through the slave shaft 60 and the speed-reducing mechanism 69.

The ACG starter motor 21*a* and the electric motor 21*b* are connected to a battery 74. Power is supplied from the battery 74 to the motors 21*a* and 21*b* when these motors 21*a* and 21*b* function as a starter and an engine, respectively. Regenerative power is charged into the battery 74 when the motors 21*a* and 21*b* function as generators. Further, in the case of the vehicle of this embodiment, the electric motor 21*b* is mainly driven by power generated by the ACG starter motor 21*a* at the time of starting the vehicle. The engine 20, the ACG starter motor 21*a* and the electric motor 21*b* are controlled by a control unit 7.

The engine 20 takes in an air-fuel mixture from an intake pipe 16 and burns it. An electronically controlled throttle adjuster 90 for controlling the amount of intake air is installed in the intake pipe 16. The throttle adjuster 90 includes a throttle valve 17 whose opening is adjusted by a motor (not shown). The motor is controlled by controller installed in the control unit 7. An injector 18 for supplying fuel to the engine, and a negative pressure sensor 19 for detecting a negative pressure in the intake pipe 16, are interposed between the throttle valve 17 and the engine 20.

Figure 3:
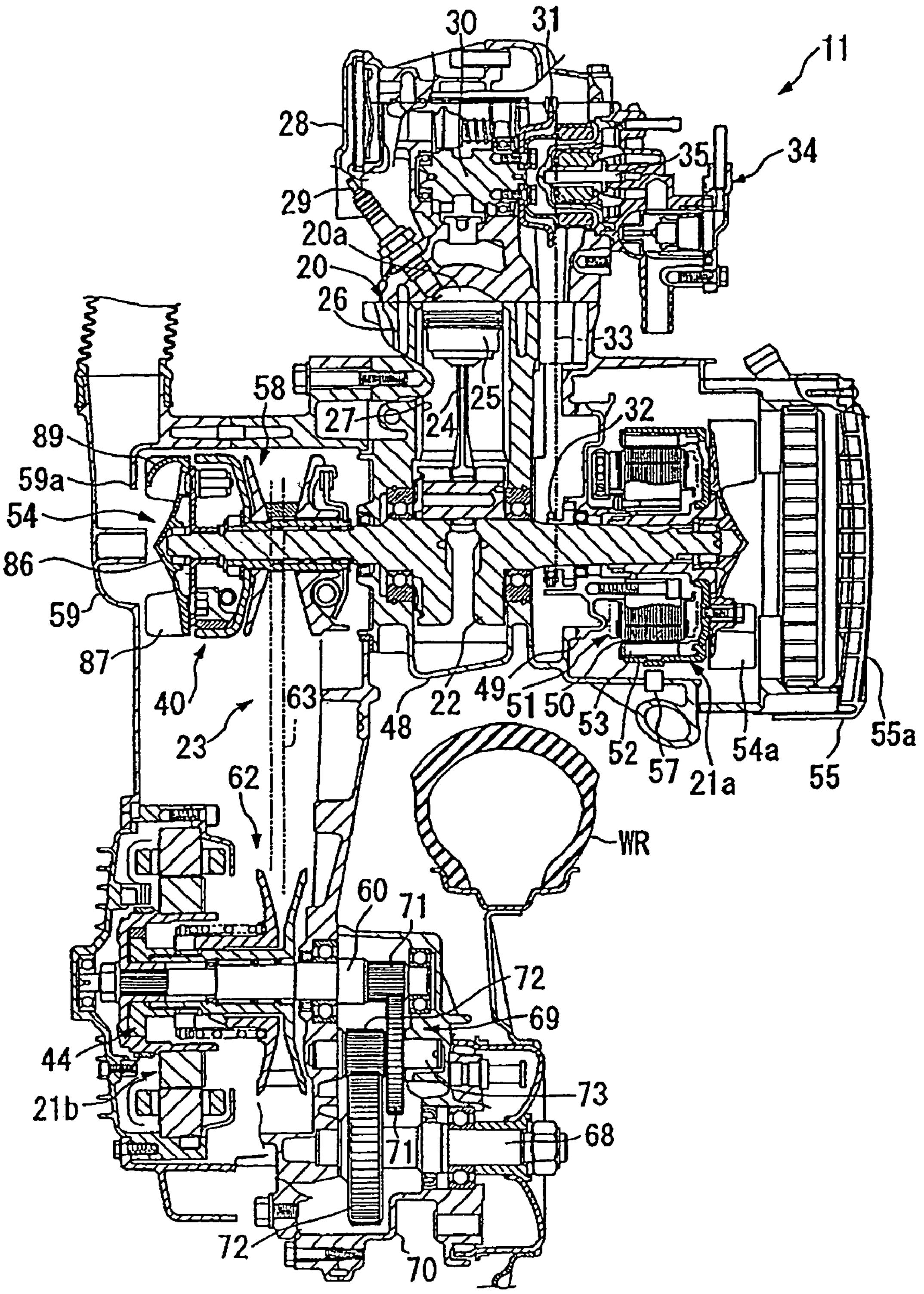
FIG. 3 is a cross-sectional view of a power unit which is a component of the vehicle of FIG. 1, showing an ACG starter motor disposed at one end of the crankshaft, and a continuously variable transmission disposed at the opposed end of the crankshaft.

The specific constitution of the power unit 11 will now be described with reference to FIG. 3. The piston 25 of the engine 20 is slidably stored in the cylinder 27 of a cylinder block 26, and a crankshaft 22 is connected to the piston 25 by a connecting rod 24. The cylinder block 26 is arranged such that the axis of the cylinder 27 is substantially horizontal, and a cylinder head 28 is fixed to the head of the cylinder block 26 to close one end of the cylinder 27. A combustion chamber 20*a* for burning the air-fuel mixture is formed between the cylinder head 28 and the piston 25.

The cylinder head 28 incorporates valves (not shown) for controlling the inlet or outlet of the air-fuel mixture to the combustion chamber 20*a* and an ignition plug 29. The opening and closing of the valves are controlled by the rotation of a cam shaft 30 supported on the cylinder head 28. The cam shaft 30 has a slave sprocket 31 at one end, and an endless cam chain 33 encircles both the slave sprocket 31 and a drive sprocket 32 provided at one end of the crankshaft 22. The cam shaft 30 turns together with the rotation of the crankshaft 22 through the cam chain 33. A water pump 34 for cooling the engine 20 is installed at one end of the cam shaft 30.

A stator case 49 is connected to the right side in the vehicle width direction of a crank case 48 for supporting the crankshaft 22, and the ACG starter motor 21*a* is stored in the stator case 49. This ACG starter motor 21*a* is a so-called outer rotor type motor, and its stator is composed of a coil whose lead is wound around teeth 50 fixed to the stator case 49. An outer rotor 52 is fixed to the crankshaft 22, and is substantially cylindrical, covering the outer wall of the stator. A magnet 53 is fixed on the inner wall of the outer rotor 52.

A centrifugal fan 54*a* for cooling the ACG starter motor 21*a* is mounted to the outer rotor 52 so that it turns in synchronism with the crankshaft 22. As a result, fresh, cooling air is taken in through suction ports formed in the side wall 55*a* of the cover 55 of the stator case 49.

The drive side transmission pulley 58 of the continuously variable transmission 23 is fitted onto the left end portion of the crankshaft 22, extending from the crank case 48 in the vehicle width direction through the centrifugal clutch 40.

The continuously variable transmission 23 includes the drive side transmission pulley 58 supported on the crankshaft 22, a slave side transmission pulley 62 fitted onto the slave shaft 60 whose axis is parallel to the crankshaft 22 through the one-way clutch 44, and an endless V-shaped belt 63 for transmitting torque to the slave side transmission pulley 62 from the drive side transmission pulley 58.

Figure 4:
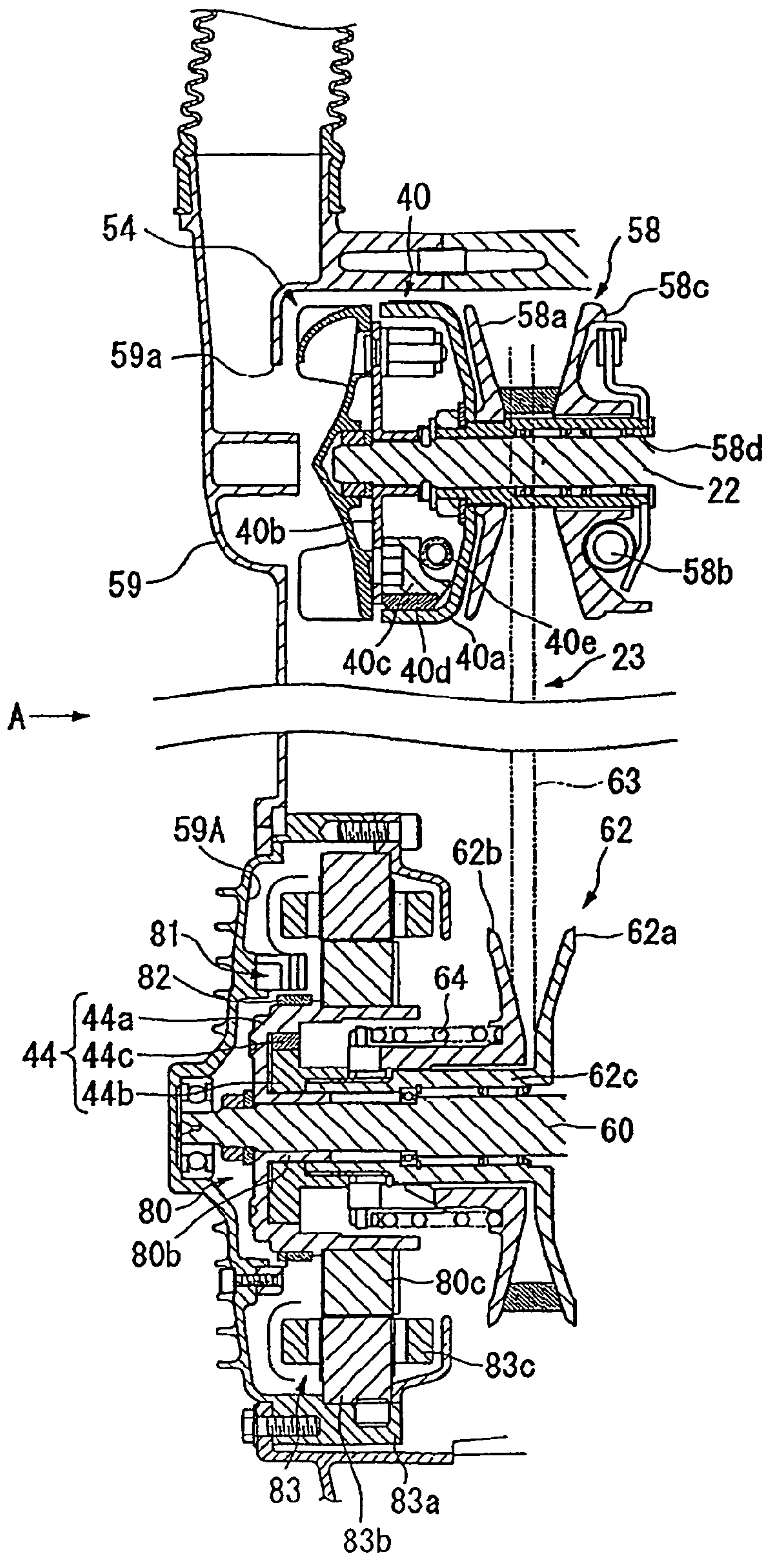
FIG. 4 is a detail view of a portion of FIG. 3, showing the continuously variable transmission.
Figure 7:
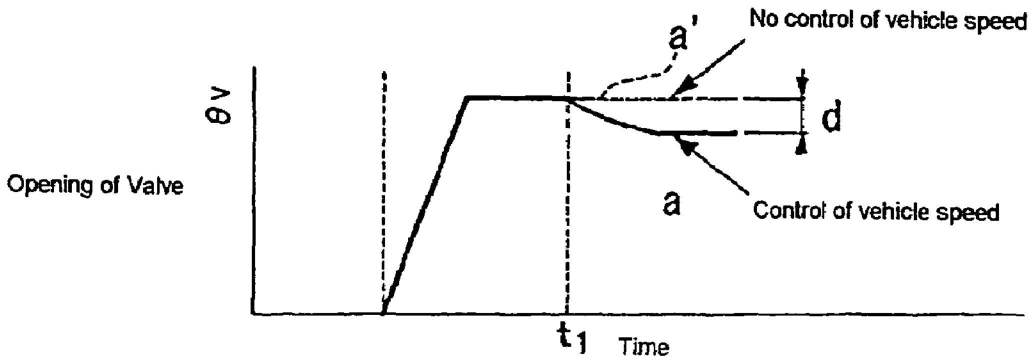
FIG. 7 is a graph of throttle valve opening (θv) versus time over the same time period as shown in FIG. 6(A), in which after a time $t_1$, the throttle valve opening is gradually reduced from an opening amount, corresponding to no regulation by the performance control system (shown by broken line a'), by an amount d, to a regulated opening amount (shown by solid line a).

An enlarged view of the continuously variable transmission 23 is shown in FIG. 4. In this figure, it can be seen that the drive side transmission pulley 58 is rotatably fitted onto the crankshaft 22 through a sleeve 58*d*. The drive side transmission pulley 58 includes a drive side fixed pulley half body 58*a* fixed on the sleeve 58*d*, and a drive side movable pulley half body 58*c*. The drive side movable pulley half body 58*c* is attached to the sleeve 58*d* in such a manner that it can move in the axial direction of the sleeve 58*d* and cannot turn in the peripheral direction. A weight roller 58*b* changes the position of the pulley half body 58*c* in the direction of the drive side fixed pulley half body 58*a* according to its centrifugal force, and is mounted in the drive side movable pulley half body 58*c*.

Meanwhile, the slave side transmission pulley 62 includes a slave side fixed pulley half body 62*a* rotatably fitted onto the slave shaft 60 in such a manner that its movement in the axial direction is limited, but it can turn in the peripheral direction. A slave side movable pulley half body 62*b* is mounted on the boss portion 62*c* of the slave side fixed pulley half body 62*a* in such a manner that it can move in the axial direction. A spring 64, which always urges the slave side movable pulley half body 62*b* toward the slave side fixed pulley half body 62*a*, is provided on the rear face side (left side in the vehicle width direction) of the slave side movable pulley half body 62*b*.

The V-shaped belt 63 is fitted in belt grooves having a V-shaped sectional form. Belt grooves are formed between the drive side fixed pulley half body 58*a* and the drive side movable pulley half body 58*c*, and between the slave side fixed pulley half body 62*a* and the slave side movable pulley half body 62*b*.

The above continuously variable transmission 23 is constituted such that when the rotational speed of the crankshaft 22 increases, centrifugal force is applied to the weight roller 58*b* of the drive side transmission pulley 58 so that the drive side movable pulley half body 58*c* moves toward the drive side fixed pulley half body 58*a*. Since the drive side movable pulley half body 58*c* approaches the drive side fixed pulley half body 58*a*, the width of the groove in the drive side transmission pulley 58 decreases, and the contact position between the drive side transmission pulley 58 and the V-shaped belt 63 shifts outward in the radial direction of the drive side transmission pulley 58. As a result, the diameter of the wound V-shaped belt 63 increases. Thereby, the width of the groove formed by the slave side fixed pulley half body 62*a* and the slave side movable pulley half body 62*b* of the slave side transmission pulley 62 increases. In other words, the diameter (transmission pitch diameter) of the wound V-shaped belt 63 changes continuously, and the change gear ratio changes automatically and in a non-stepwise manner according to the rotational speed of the crankshaft 22.

The centrifugal clutch 40 is fitted onto the end portion on the left side of the body of the crankshaft 22 extending through the drive side fixed pulley half body 58*a* of the continuously variable transmission 23. The centrifugal clutch 40 includes a cup-like outer case 40*a* fixed to the sleeve 58*d*, and an inner plate 40*b* is fixed to the left end portion of the crankshaft 22 extending through the outer case 40*a*. The centrifugal clutch 40 also includes a shoe 40*d* mounted on the weight 40*c*, which in turn is mounted on the outer case 40*a* side wall of the inner plate 40*b* to face outward in the radial direction. A spring 40*e* urges the shoe 40*d* inward in the radial direction. A centrifugal fan 54 is mounted on the outer end face of the inner plate 40*b* of the centrifugal clutch 40 so that fresh air introduced from the suction port 59*a* of a motor case 59 is circulated in the motor case 59 by the blowing function of the centrifugal fan 54.

The thus constituted centrifugal clutch 40 transmits power, or cuts off power, according to balance between the centrifugal force of the weight 40*c* and the urging force of the spring 40*e*. When the rotational speed of the crankshaft 22 is a predetermined value (for example, 3,000 rpm) or less, power transmission is cut off by the urging force of the spring 40*e*. When the rotational speed of the crankshaft 22 exceeds the above predetermined value, the centrifugal force of the weight 40*c* overcomes the urging force of the spring 40*e* and the weight 40*c* moves outward in the radial direction, whereby the shoe 40*d* is pressed against the inner wall of the outer case 40*a*. At this point, friction slide occurs between the shoe 40*d* and the outer case 40*a*, thereby gradually transmitting power. As a result, the rotational speed of the crankshaft 22 is transmitted to the sleeve 58*d* through the centrifugal clutch 40 to drive the drive side transmission pulley 58 fixed to the sleeve 58*d*.

The one-way clutch 44 includes a cup-like outer clutch 44*a*, an inner clutch 44*b* fitted coaxially in the outer clutch 44*a*, and a roller 44*c* capable of the one-way transmission of power to the outer clutch 44*a* from the inner clutch 44*b*. The outer clutch 44*a* also serves as the inner rotor body of the electric motor 21*b* and is composed of the same member as the inner rotor body. The inner wall of the inner clutch 44*b*, and the left end portion of the boss portion 62*c* of the slave side fixed pulley half body 62*a* are spline-connected to each other.

Therefore, the one-way clutch 44 transmits the power of the engine 20, transmitted to the slave side transmission pulley 62 of the continuously variable transmission 23, to the rear wheel WR through the slave shaft 60 and the speed-reducing mechanism 69. However, the one-way clutch 44 does not transmit torque in the forward direction of the vehicle. For example, torque input from the rear wheel WR is not transmitted through the speed-reducing mechanism 69 and the slave shaft 60 to the continuously variable transmission 23. Therefore, when the vehicle is pushed manually or at the time of regenerative operation, the power of the rear wheel WR merely causes the idling of the outer clutch 44*a* relative to the inner clutch 44*b*, and is not transmitted to the continuously variable transmission 23 and the engine 20.

The speed-reducing mechanism 69 has an intermediate shaft 73 supported in parallel to the slave shaft 60 and the axle 68 of the rear wheel WR. It also includes a pair of first speed reducing gears 71 and 71 formed at the right end of the slave shaft 60 and the center of the intermediate shaft 73, and a pair of second speed reducing gears 72 and 72 formed at the left ends of the intermediate shaft 73 and the axle 68.

The speed-reducing mechanism 69 reduces the rotational speed of the slave shaft 60 by means of a predetermined gear ratio, and transmits it to the axle 68 of the rear wheel WR parallel to the slave shaft 60.

The electric motor 21*b* is an inner rotor type motor having the slave shaft 60 as a motor output shaft. The above-described outer clutch 44*a* forms the body of an inner rotor 80. The stator 83 of the electric motor 21*b* is fixed in the motor case 59, which covers the centrifugal clutch 40 and the side portion of the continuously variable transmission 23. The stator 83 is fixed through the stator case 83*a*, and is provided with teeth 83*b* wound with a coil 83*c*.

The outer clutch 44*a* is formed like a cup, and a boss portion 80*b* projecting from the center of the outer clutch 44*a* is spline-connected to the slave shaft 60. A magnet 80*c* is mounted on the outer wall on the opening side of the outer clutch 44*a* so as to face the teeth 83*b* of the above stator 83. A plurality of objects 82, to be detected by a rotor sensor 81 mounted on the inner wall 59A of the motor case 59, are set on the outer wall on the bottom side of the outer clutch 44*a*.

The thus constituted electric motor 21*b* serves as an engine to assist the output of the engine 20 at the time of starting. The electric motor 21*b* also serves as a generator, which converts the rotational speed of the slave shaft 60 into electric energy used to charge the battery 74 shown in FIG. 2.

Figure 2:
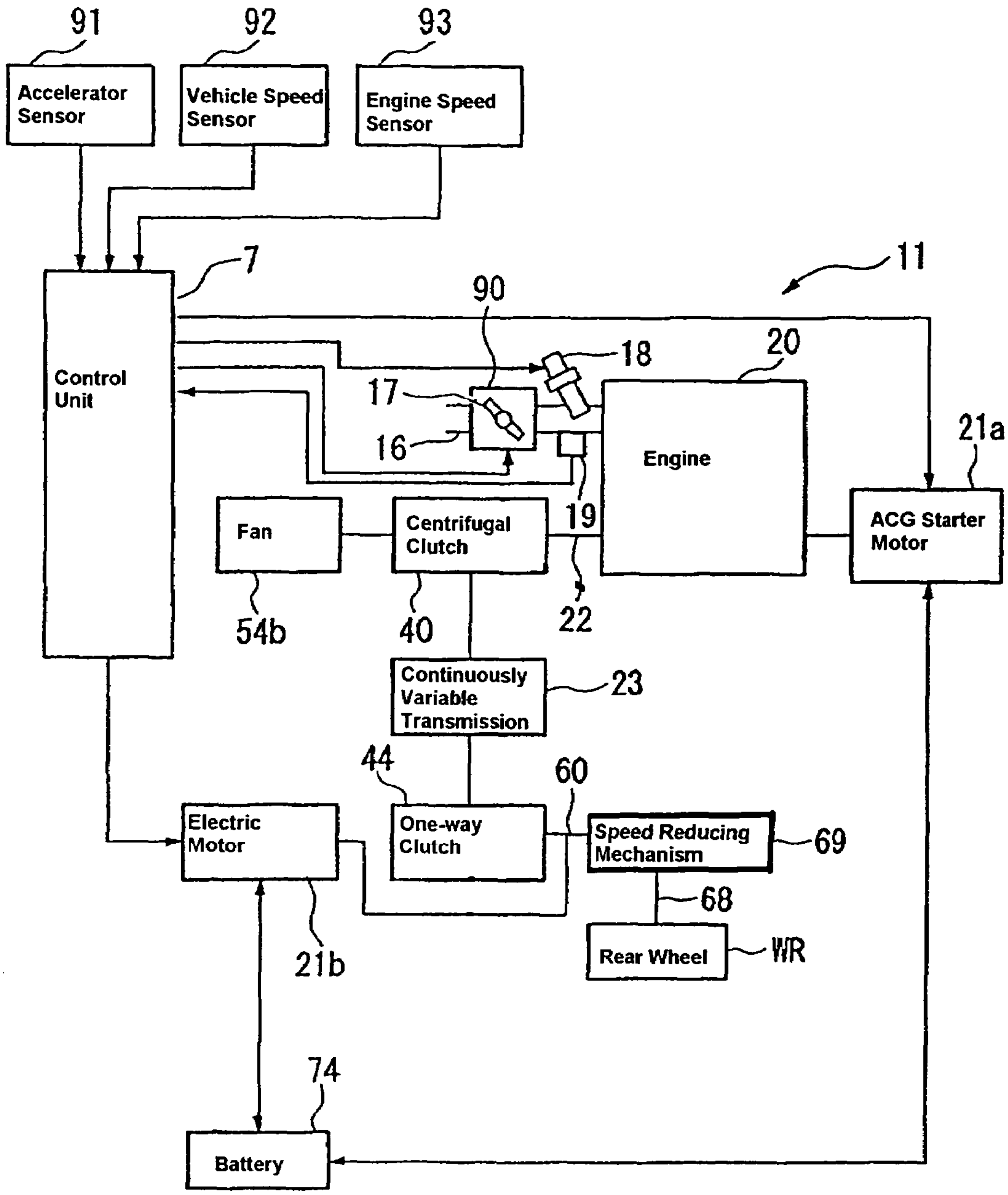
FIG. 2 is a functional block diagram of the drive systems of the vehicle of FIG. 1.

As shown in FIG. 2, an accelerator position sensor 91 (accelerator position sensor in the present invention) for detecting the position of an accelerator grip (accelerator in the present invention), a vehicle speed sensor 92 for detecting the operating speed of the vehicle, and an engine speed sensor 93 for detecting the speed of the engine 20 are connected to the input side of the control unit 7. The control unit 7 controls the opening of the throttle valve 17, opening the throttle valve 17 to a value based on the position of the accelerator grip (see FIGS. 6(A) to 6(C)). In the illustrated embodiment, the control unit 7 controls the opening of the throttle valve in proportion to the position of the accelerator grip. FIGS. 6(A) to 6(C) show the relationship between the vehicle speed V (FIG. 6(A)), the opening θa of the accelerator grip (FIG. 6(B)), and the opening θv of the throttle valve 17 (FIG. 6(C)) in this embodiment. In FIG. 6(C), the characteristic line consisting of the solid line up to the time $t_1$ and the broken line a' after $t_1$ shows the standard opening of the throttle valve 17, which is in proportion to the opening of the accelerator grip.

In this embodiment, the throttle adjuster 90 and the control unit 7 constitute the performance control system of the present invention together with the accelerator position sensor 91 and the vehicle speed sensor 92. The control unit 7 controls the motor of the throttle adjuster 90 to reduce the actual opening of the throttle valve 17 from the standard opening (broken line a') of the throttle valve 17 by a set value d as shown in FIG. 6(C). Thus, the regulated opening of the throttle valve is represented by the solid line a in this figure.

The operation of a motorcycle, which includes the engine control regulator, will now be described.

When an engine start is initiated, the ACG starter motor 21*a* on the crankshaft 22 is used to turn the crankshaft 22. At this point, the centrifugal clutch 40 is not connected to the crankshaft 22, so that power is not transmitted from the crankshaft 22 to the continuously variable transmission 23. The air-fuel mixture, taken into the cylinder 27 in synchronism with the rotational speed of the crankshaft 22, is burnt by the ignition plug to reciprocate the piston 25.

To start the vehicle from this state, the electric motor 21*b* is activated by power generated by the ACG starter motor 21*a*, or the power of the battery 74, to transmit the drive force of the electric motor 21*b* in proportion to the position (opening) of the accelerator grip by the driver to the rear wheel. When the rotational speed of the crankshaft 22 increases in proportion to the opening of the accelerator grip, and the speed of the engine 20 exceeds a predetermined value (for example, 3,000 rpm), the torque of the crankshaft 22 is transmitted to the continuously variable transmission 23 through the centrifugal clutch 40. When the power of the engine 20 is transmitted to the speed-reducing mechanism 69 from the continuously variable transmission 23 through the one-way clutch 44, the rear wheel WR is turned, and the electric motor 21*b* is stopped, whereby the vehicle is switched engine drive mode. Once the vehicle has started, it is generally driven by the engine 20.

When the vehicle is driven by the engine 20, the amount of the opening of the throttle valve 17 is adjusted in proportion to the operation of the opening of the throttle valve by the driver as described above. However, as shown in FIGS. 6(A) to 6(C), when the vehicle speed V reaches a predetermined value, which in this case is the limit speed VL, the vehicle speed is controlled by the performance control system of the present invention. The operation of the performance control system will be described hereunder with reference to the flow chart of FIG. 5.

The control unit 7 (controller) detects the operating speed of the vehicle from the detection signal of the vehicle speed sensor 92 in step S101, and judges whether the actual vehicle speed V exceeds the limit speed VL or not in step S102. When it is judged that the vehicle speed V does not reach the limit speed VL in step S102, the controller process returns to step S101. When it is judged that the vehicle speed V exceeds the limit speed VL, the controller process proceeds to step S103, in which the opening of the throttle valve 17 is reduced from the standard opening. Therefore, for example, in the operation state shown in FIGS. 6(A) to 6(C), even if the opening Va of the accelerator grip is fully opened, the opening of the throttle valve 17 is reduced by an amount “d” when the vehicle speed V exceeds the limit speed VL (see the solid line a in FIG. 6(C)). As a result, the output of the engine is controlled by reducing the amount of intake air. Thereby, the vehicle speed V is limited to the limit speed VL.

The performance control system reduces the actual opening of the throttle valve 17 based on the position of the accelerator grip, as described above, to reduce the amount of intake air so as to regulate the output of the engine. Therefore, as compared with a performance control system of the prior art, which regulates the output of the engine by cutting or thinning down the number of engine ignition times or suspending fuel supply, the combustion stability of the engine 20 is improved during regulation of the engine output. Therefore, deterioration in the operational feel as perceived by the driver, and a reduction in exhaust efficiency can be prevented.

In the above-described embodiment, the vehicle speed is monitored based on the signal of the vehicle speed sensor 92, and the opening of the throttle valve 17 is reduced from the standard opening when the vehicle speed reaches the limit speed. Alternatively, the speed of the engine 20 may be monitored based on the signal of the engine speed sensor 93, and the opening of the throttle valve 17 may be reduced from the standard opening when the speed of the engine 20 reaches a predetermined value. In this case, an increase in the speed of the engine above a predetermined value can be prevented without causing a deterioration in the operational feel as perceived by the driver, and a reduction in exhaust efficiency. In a second alternative, both the vehicle speed V and the speed of the engine 20 may be monitored based on the signals of the vehicle speed sensor 92 and the engine speed sensor 93, and the opening of the throttle valve 17 may be reduced from the standard opening when either one of the speeds exceeds the predetermined value.

When the vehicle is driven by the electric motor 21*b*, the electric motor 21*b* is accurately controlled based on the detection value of the accelerator position sensor 91, whereby an increase in the vehicle speed from the predetermined value is suppressed.

Further, in the above embodiment, as shown in FIGS. 6(A) to 6(C), when the vehicle speed reaches the predetermined value (limit speed VL), the opening of the throttle valve 17 is temporarily reduced by the predetermined value “d”. Although this reduction is illustrated as a step reduction in FIG. 6(C), it is understood that the opening of the throttle valve 17 may be gradually reduced from the point of time when the vehicle speed reaches the predetermined value. In this case, since a reduction in the opening of the throttle valve 17 is gentle, deterioration in the operational feel of the vehicle as perceived by the driver becomes less. Even when the speed of the engine 20 is regulated as described above, the opening of the throttle valve 17 may be reduced gradually likewise.

The present invention is not limited to the above embodiment and various design modifications may be made in the present invention without departing from the spirit and scope of the present invention. In the above embodiment, the performance control system of the present invention is applied to the engine of a hybrid type scooter. This performance control system may be applied to an ordinary two-or four-wheeled vehicle if it is a vehicle including an engine having an electronically controlled throttle adjuster.

While a working example of the present invention has been described above, the present invention is not limited to the working example described above, but various design alterations may be carried out without departing from the present invention as set forth in the following claims. The foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A performance control system for a vehicle, said performance control system adapted to regulate the performance of an engine in the vehicle to ensure that at least one speed parameter, selected from engine speed and vehicle speed, does not exceed a maximum allowed value for that speed parameter, the vehicle comprising an accelerator and the engine, wherein the engine comprises an intake pipe and a throttle valve mounted within the intake pipe, said performance control system comprising:

an accelerator position sensor for detecting a position of the accelerator;

an electronically controlled throttle adjuster for adjusting an opening of the throttle valve, wherein the throttle adjuster is capable of setting the throttle valve at an applied opening; and a controller for controlling operation of the throttle adjuster to vary the applied opening based on an output from the accelerator position sensor, wherein the system is configured such that during vehicle operation, when the selected speed parameter reaches its maximum allowed value, the throttle valve opening is automatically reduced to a level at or below an applied opening thereof that immediately preceded the reaching of said maximum allowed value, based on the sensed position of the accelerator.

2. The performance control system according to claim 1, wherein the applied opening of the throttle valve is gradually reduced when the selected speed parameter reaches its maximum allowed value.

3. The performance control system according to claim 1, wherein the applied opening of the throttle valve is step-reduced when the selected speed parameter reaches its maximum allowed value.

4. The performance control system according to claim 1, wherein the performance control system further comprises a vehicle speed sensor, and wherein the system is constructed and arranged such that during vehicle operation, when an output of the vehicle speed sensor reaches a maximum speed value, the throttle valve opening is automatically reduced to a level at or below an applied opening thereof that immediately preceded the reaching of said maximum speed value, based on the sensed position of the accelerator.

5. A performance control system for use in a hybrid vehicle, wherein the hybrid vehicle comprises an accelerator, a power unit, and a drive wheel operatively connected to the power unit, wherein the power unit comprises an internal combustion engine, an electric motor, and a battery, wherein the engine comprises an intake pipe and a throttle valve mounted within the intake pipe, wherein the electric motor is adapted to supply power to the drive wheel, based on power received from the battery, and wherein the performance control system comprises:

an accelerator position sensor for detecting a position of the accelerator;

an electronically controlled throttle adjuster for adjusting the opening of the throttle valve, wherein the throttle adjuster is capable of setting the throttle valve at an applied opening; and a controller for controlling the operation of the throttle adjuster to vary the applied opening based on an output of the accelerator position sensor; and wherein during vehicle operation, when at least one speed parameter, selected from engine speed and vehicle speed, reaches a maximum allowed value, the throttle valve opening is automatically reduced to a level at or below an applied opening thereof that immediately preceded the reaching of said maximum allowed value, based on the sensed position of the accelerator.

6. The performance control system of claim 5, wherein the system is operable to:

switch the drive source of the vehicle to at least one of the engine or the electric motor, regulate an output of the engine to ensure that the selected speed parameter does not exceed its maximum allowed value, and control an output of the electric motor, based on the output of the accelerator position sensor.

7. The performance control system according to claim 5, wherein the opening of the throttle valve is gradually reduced when the selected speed parameter reaches the maximum allowed value.

8. The performance control system according to claim 5, wherein the opening of the throttle valve is step-reduced when the when the selected speed parameter reaches the maximum allowed value.

9. The performance control system according to claim 5, wherein the performance control system further comprises a vehicle speed sensor, and wherein the system is constructed and arranged such that during vehicle operation, when an output of the vehicle speed sensor reaches a maximum speed value, the throttle valve opening is automatically reduced to a level at or below an applied opening thereof that immediately preceded the reaching of said maximum speed value, based on the sensed position of the accelerator.

10. A method of regulating performance of an engine in a vehicle, said method comprising the steps of:

monitoring engine speed using an engine speed sensor, where sensed engine speed constitutes a first speed parameter;

comparing the sensed engine speed to a first programmed value;

monitoring speed of the vehicle using a vehicle speed sensor, where sensed vehicle speed constitutes a second speed parameter;

comparing the sensed vehicle speed to a second programmed value;

monitoring a position of an accelerator using an accelerator position sensor;

adjusting an opening of a throttle valve on the engine using an electronically controlled throttle adjuster, wherein the throttle adjuster is capable of setting the throttle valve at an applied opening;

controlling operation of the throttle adjuster to vary the applied opening based on an output from the accelerator position sensor; and reducing the applied opening of the throttle valve to a level at or below an applied opening thereof that immediately preceded the reaching of a maximum allowed value, based on the sensed position of the accelerator, when a selected speed parameter matches or exceeds its respective programmed value.

11. The method of claim 10, wherein the vehicle is a hybrid vehicle including an internal combustion engine and an electric motor.

12. The method of claim 10, wherein the applied opening of the throttle valve is gradually reduced when the selected speed parameter reaches its respective programmed value.

13. The method of claim 10, wherein the applied opening of the throttle valve is step-reduced when the selected speed parameter reaches its respective programmed value.

14. A vehicle, comprising an internal combustion engine, an accelerator, and a performance control system adapted to regulate the performance of the engine to ensure that at least one speed parameter, selected from engine speed and vehicle speed, does not exceed a maximum allowed value for that speed parameter, wherein the engine comprises an intake pipe and a throttle valve mounted within the intake pipe, said performance control system comprising:

an accelerator position sensor for detecting a position of the accelerator;

an electronically controlled throttle adjuster for adjusting an opening of the throttle valve, wherein the throttle adjuster is capable of setting the throttle valve at an applied opening; and a controller for controlling operation of the throttle adjuster to vary the applied opening based on an output from the accelerator position sensor, wherein the system is configured such that during vehicle operation, when the selected speed parameter reaches its maximum allowed value, the throttle valve opening is automatically reduced to a level at or below an applied opening thereof that immediately preceded the reaching of said maximum allowed value, based on the sensed position of the accelerator.

15. The vehicle of claim 14, wherein the vehicle is a hybrid vehicle including an internal combustion engine and an electric motor.

* * * * *